United States Patent [19]
Ackermann et al.

[11] 3,819,573
[45] June 25, 1974

[54] POLYMER STABILIZERS PREPARED FROM LACTAMS OR LACTONES AND PHENOLIC COMPOUNDS

[75] Inventors: Jacob Ackermann, Gorla Minore; Pierino Radici, Turate, both of Italy

[73] Assignee: Societa' Italiana Resine S.p.A., Milan, Italy

[22] Filed: Nov. 9, 1971

[21] Appl. No.: 197,156

[30] Foreign Application Priority Data
Nov. 12, 1970 Italy ................................ 31633/70

[52] U.S. Cl..... 260/45.9 R, 260/47 CZ, 260/47 CP, 260/87 A, 260/78.3, 260/830 P, 260/835, 260/857 OX, 260/860
[51] Int. Cl............................................ C08g 51/54
[58] Field of Search.... 260/47 CZ, 857 OX, 54.9 R, 260/78 A, 78.3, 47 CP, 830 P, 835, 860

[56] References Cited
UNITED STATES PATENTS

| | | | |
|---|---|---|---|
| 3,288,885 | 11/1966 | Green et al. | 260/857 |
| 3,363,027 | 1/1968 | Schnegg et al. | 260/857 |
| 3,592,873 | 7/1971 | Ishida et al. | 260/857 |
| 3,632,686 | 1/1972 | Ackermann et al. | 260/895 |

*Primary Examiner*—Lester L. Lee
*Attorney, Agent, or Firm*—Sughrue, Rothwell, Mion, Zinn and Macpeak

[57] ABSTRACT

Stabilisers for polymers derived at least in part from phenolic monomers are made by polymerisation of:
  either lactones, lactams, or reactive amine compounds, and optionally dibasic acids also, or their pre-polymerisates, with phenol acids or esters or halides thereof
  or alternatively lactones, lactams, or acids or acid halides, and optionally diamines also, or their pre-polymerisates, with phenolic amines.

3 Claims, No Drawings

POLYMER STABILIZERS PREPARED FROM LACTAMS OR LACTONES AND PHENOLIC COMPOUNDS

The present invention relates to a new class of compound having a stabilizing action with respect to substances of a polymeric nature. More precisely, the present invention relates to a class of compounds capable of preventing those degradation phenomena which organic type polymers suffer under the action of heat, oxygen, light and any impurities present in them.

From another point of view, the present invention relates to the manufacture of such stabilizing compounds.

It is well known that when organic macromolecular substances and in particular thermoplastic polymers are brought to elevated temperatures (for example melting temperature) and come in contact with highly reactive chemical agents (for example oxygen) and with ultraviolet radiations (for example sunlight), serious changes take place in their mass such as for example the formation of undesired products, undesired coloration, lessening in mechanical strength.

Such changes are due to processes of degradation such as depolymerization or to variations in structure such as reticulation (cross-linking).

In order to avoid such undesired phenomena, industry makes use of stabilizing substances which are incorporated into the polymer.

For example, antioxidizing agents are normally used to inhibit attack due to the action of oxygen and heat, while the products which form following phenomena od degradation of the polymer are blocked by the action of compounds suitable for the purpose.

Thus, for example, it is necessary to ensure absorption of corrosive acids in lubricating oils, of hydrochloric acid which is developed in polyvinylchloride and formaldehyde which is released ik polyoxymethylenes.

The stabilizers known in the prior art are not however completely satisfactory, above all due to their ready volatilization during the processes of conversion of the polymeric mass at high temperature and the fact that they are so readily extractable by the solvents with which the finished products come in contact (for example organic liquids, water and detergents, liquors).

Such stabilisers are not completely satisfactory also by virtue of their frequent incompatibility with the polymers, in the sense that they are not sufficiently soluble in such polymers, change their mechanical properties, transparency, outward appearance.

In view of their specific action in stabilisation (they prevent changes due to heat, oxygen or sunlight), it is difficult to use such compounds for the complete stabilisation of the polymers, but normally for the purpose mixtures of them are required. In addition, on account of the ready extractability of stabilisers and due to the fact that very often stabilisers are toxic, substances kept in containers made from polymers which are so stabilised often become contaminated.

This fact greatly restricts the use of organic polymers in the production of containers for pharmaceutical products and foodstuffs.

It has now been found possible to stabilise organic polymers and avoid the above-described drawbacks by incorporating a new class of stabilisers in the polymers.

It is therefore an object of the present invention to provide a class of non-volatile compounds which cannot be extracted by aqueous solutions of organic liquids, which have a stabilising action in respect of organic polymers.

A further object of the present invention is to provide a new class of highly active stabilisers which are completely compatible with organic polymers.

A further object of the present invention is a class of stabilisers which at the same time prevent changes due to heat and atmospheric agents. A further object of the present invention is the manufacture of such stabilisers.

Further objects of the invention will become manifest from the following description.

The stabilizers of the present invention are essentially constituted by those substances which have a molecular weight in excess of at least 1,000, belonging to types 1 and 2, which are obtained as follows:

a. Type 1 — by polymerization of lactones and/or lactams and/or compounds having primary or secondary reactive amine groups, possibly in the presence of dibasic acids, together with phenol compounds containing carboxyl, esterified carboxyl or halogenated carboxyl (acid halide) reactive groups; or by reaction of phenol compounds containing carboxyl groups, esterified carboxyl groups or halogenated carboxyl groups with the products of polymerization of lactones and/or lactams and/or compounds having primary or secondary reactive amine groups, possibly in the presence of dibasic acids;

b. Type 2 — by the polymerization of lactones and/or lactams and/or compounds having carboxyl groups or carboxylic halogen (acid halide) groups possibly in the presence of diamines, together qith phenol compounds containing primary or secondary reactive amine groups; or by reaction of phenol compounds containing primary or secondary reactive amine groups with the products of polymerization of lactones and/or lactams and/or compounds having carboxyl groups or carboxylic halogen groups, possibly in the presence of diamines.

More precisely, the phenol compounds containing carboxyl, esterified carboxyl or halogenated carboxyl reactive groups mentioned above are those which can be represented by the following general formula:

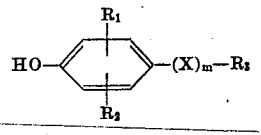

in which X represents a linear or ramified (branched) chain alkyl radical, $m$ being a number equal to 0 or 1; $R_1$ and $R_2$ represent equal or different alkyl radicals, containing from one to six carbon atoms; $R_3$ represents a group of an acid nature and preferably a carboxyl, esterified carboxyl or halogenated carboxyl group.

Examples of phenol compounds containing carboxyl, esterified carboxyl or halogenated carboxyl reactive groups which may be used are: beta-(4-hydroxy-3,5-ditertiary-butyl-phenyl) propionic acid, methyl-beta-(4-hydroxy-3,5-ditertiary-butyl-phenyl) propionate and beta(4-hydroxy-3,5-ditertiary-butyl-phenyl) propionyl chloride.

As compounds containing primary or secondary reactive amine groups, reactive polyamides, polyamines, diamines and amino acids are preferably used.

The term reactive polyamides is taken to means those products which are obtained by polycondensing dibasic acids of the general formula: $R(COOH)_2$ alone or in mixture inter se, either in acid form or salified, with polyamine to the general formula: $R(NHR_1)_z$. In this case, R may be an aliphatic, aromatic, cycloaliphatic radical, while $R_1$ represents an alkyl radical with one to six carbon atoms or a hydrogen atom, while Z is a number greater than 2.

This definition is in accordance with that described on pages 48 and 61 of "polyamide Resins" by Floyd-Reinholds, Ed. 1958. For example, diethylene triamine $NH_2-(CH_2)_2-NH-(CH_2)_2-NH_2$ and tri-2-aminopropylether of a triol such as 1,2,6-hexantriol may be used for the preparation of reactive polyamides.

Reactive polyamides as defined above, for example certain types of "Versamide" are available commercially.

The reaction of the phenol compounds with the reactive polyamides to produce stabilisers of type 1 is carried out in an inert atmosphere and under controlled humidity conditions, at temperatures above ambient, the reagent being maintained dissolved in an inert solvent.

During this reaction, the polyamides and the phenol compound are present in such a quantity that the ratio between equivalents of free amine groups contained in the polyamide and moles of phenol compound is equal to or greater than 1:1.

In such cases, there is no relationship of any kind between this ratio and the molecular weight of the end product obtained.

It iw therefore possible to produce products with a very high molecular weight which at the same time maintain a large quantity of phenol compound bonded to them.

Stabilisers of type 1 which are suitable for the purposes of the present invention can be obtained also by condensing the phenol compound in a first stage with the polyamine $R(NHR_1)_z$ with a molar ratio of phenol compound to polyamine equal to or less than $(Z-2)$.

The reaction is preferably carried out in the absence of oxygen at a temperature above ambient levels, and preferably above 100°C and at a pressure below atmospheric levels, in the presence of solvents or otherwise.

In a second phase, the product obtained in the first phase is condensed with dibasic acid of the general formula: $R(COOH)_2$ with a preferred molar ratio of 1:1.

According to another procedure, both phases can occur at the same time, the same working conditions of the reaction between reactive polyamide and phenol compounds being maintained.

The type 1 stabilisers of the present invention may also be produced by reaction of phenol compounds containing carboxyl, esterified carboxyl or halogenated carboxyl reactive groups, defined above, with the products of polymerisation of mixtures of dibasic acids of the general formula: $R(COOH)_2$, in acid or salified form, and diamine to the general formula: $R(NH_2)_z$, in which R may be an aliphatic, aromatic or cycloalihpatic radical.

For example, it is possible to use mixtures of sebacic acid and hexamethylene diamine, adipic acid and octamethylene diamine, adipic acid and 3-amino-methyl-3,5,5-trimethyl-cyclohexyl-amine, terephthalic acid and 2,2,4-trimethyl hexamethylene diamine.

Good results are also obtained by causing phenol compounds containing carboxyl, esterified carboxyl or halogenated carboxyl reactive groups to react with the products of polymerisation of amino acids to the general formula $NH_2 \rightarrow R-COOH$, in which R may be an aliphatic, aromatic or cycloaliphatic radical.

For example, it is possible to use ω-aminocapronic acid, amino enantic acid and ω-aminoundecanoic acid. Stabilisers of type 1 can also be produced by reaction of the above-mentioned phenol compounds with the polymers of lactones and/or lactams.

More precisely, the lactones which can be used for this purpose are represented by the general formula:

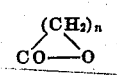

while the lactams are represented by the general formula:

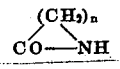

in which n is a number which can vary from 3 to 13.

For example, it is possible to use polymers obtained from ε-caprolactone and caprolactam alone or in mixture inter se. In another form of embodiment, stabilisers of type 1 of the present invention may be obtained by polymerisation of lactones and/or lactams and mixtures of dibasic acids to the general formula: $R(COOH)_2$, in acid or salified form, and diamine to the general formula $R(NH_2)_2$, or amino acids to the general formula $NH_2 - R - COOH$ with the above-described phenol compounds.

Also very useful for the production of stabilisers of type 1 are mixtures of amino acids to the general formula $NH_2- R-COOH$, lactams and/or lactones, in which the components may be variously combined inter se.

Such mixtures may be prepolymerised and then the product caused to react with phenol compounds, or they can be directly submitted to polymerisation in the presence of phenol compounds.

All the reactions which result in stabilisers of type 1 being produced from lactones and/or lactams and/or amino acids and/or diamines, or their polymers, may be carried out under widely variable conditions, on account of the various types of reagents which can be used. Normally, such reactions are carried out in an inert atmosphere and at elevated temperature, preferably at a temperature above 100°C and in the absence of solvents.

The molecular weight of the end product of the reaction depends substantially upon the molar ratio of the phenol compound to the othe reagent, lactone, lactam, etc.

With regard to the type 2 stabilisers of the present invention, the phenol compounds containing primary or secondary active amino groups mentioned above are those which can be represented by the following general formula:

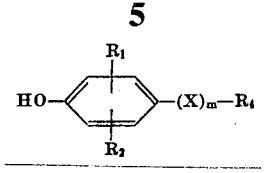

in which X represents a linear or ramified chain alkyl radical and $m$ is a number equal to 0 or 1; $R_1$ and $R_2$ represent identical or different alkyl radicals containing from one to six carbon atoms; $R_4$ represents a group of a basic nature and preferably a primary or secondary amine group. For example, beta-(4-hydroxy-3,5-ditertiary-butyl phenyl)methyl amine may be used.

Such compounds are caused to react with the products of polymerisation of lactones and/or lactams and/or compounds having carboxyl or carboxylic halogen groups, possibly in the presence of diamines, as already defined in respect of type 1 stabilisers. In the preferred embodiment, the stabilisers of type 2 are obtained by polymerisation of lactones and/or lactams and/or compounds having carboxyl or carboxylic halogen groups, possibly in the presence of diamine, together with phenol compounds containing primary or secondary reactive amine groups. The term lactams and lactones is understood to refer to the compound already defined above for type 1 stabilisers. By compounds having carboxyl or carboxylic halogen groups, in addition to the dibasic acids to the general formula $R(COOH)_2$ and the amino acids $NH_2—R—COOH$ above, it is intended to refer also to compounds to the general formula $R(COX)_m$, in which R is an aliphatic, aromatic, cycloaliphatic radical, $m$ is a number equal to or greater than 2 and X is a hydroxyl or halogen group.

$R—(COX)_m$ compounds, alone or in mixture, may be used possibly in salified form also in mixture with diamine to the general formula $R(NH_2)_2$ in which R has the same meaning as above.

For example, adipic acid dichloride may be used, or the polymers obtained by polycondensation of 2,2,4-trimethyl isomethylene diamine and trimellitic acid with a molar ratio of 1:1.

Reactions with phenol compounds to produce stabilisers of type 2 of the present invention are normally carried out in an insert atmosphere, preferably at temperatures above 100°C and in the absence of solvents.

Stabilisers of types 1 and 2 of the present invention are particularly active in preventing or considerably reducing in the thermoplastic polymers to which they are added the phenomena of degradation brought about by the action of heat, oxygen, light and any impurities present in them, when the molecular weight exceeds 1,000 and the free phenol hydroxyl groups are present to the extent of at least 0.005 percent by weight.

Such products, compared with the stabilisers already known for the purpose in the prior art, in addition to having greater stabilising ability, are characterised in that they are not volatile and cannot be extracted with aqueous solutions and with organic solvents from the finished polymers and manufactured goods.

Considerable importance as stabilisers accrues above all to those substances which require chemical inertia in respect of the finished manufactured goods with which they come in contact, for example foodstuffs and pharmaceutical products.

The compounds of the present invention which have a stabilising action are particularly suitable for the macromolecular substances of an organic nature such as the polyamides, polyacetals, polycarbonates, polyethylene terephthalate, polystyrene, polyolefin (such as polyethylene and polypropylene), polyethylene oxide, butadiene, acrylonitrile, styrene and polyvinylchloride copolymers.

The amounts of stabiliser added to the macromolecular compounds depend on the type of polymer.

Normallly, the quantity is between 0.001 and 10 percent by weight and is preferably between 0.01 and 2 percent.

The addition of such products does not exclude the possible presence of other additives in the substance to be stabilised.

An important characteristic of the stabilisers concerned is their ability to form intermolecular bonds with the macromolecular substances which are to be stabilised.

Another characteristic feature of such stabilisers is that more than one different stabilising function is combined in their molecule.

The invention will now be illustrated by the following examples which do not however constitute any limitation.

In the examples, unless otherwise indicated, the percentages are understood as being percentages by weight.

EXAMPLE 1

A mixture of 15 g ($132.7 \times 10^{-3}$ mols) pure commercial caprolactam and 7.05 g ($25.4 \times 10^{-3}$ mols) beta(4-hydroxy-3,5-ditertiary-butyl-phenyl) propionic acid was introduced into a tubular glass reactor.

This reactor was 2 cm in diameter and 15 cm tall, its top ending with a narrowed portion of 0.6 cm diameter and 3 cm long.

0.26 ml water was added to the mixture with a syringe.

By means of a three-way tap, the reactor was then connected to a vacuum water pump and to a source of nitrogen at a pressure of 0.1 atm.

The air in the reactor was eliminated by a vacuum and the introduction of nitrogen. The operation was carried out five times in an alternating pattern.

While the tube was under a vacuum, the narrowed part at the top was closed by the flame from a burner. The reactor, bound in a steel net, was heat to 250°C by immersion in an oil bath and kept at that temperature for 6 hours.

The tube was finally cooled, carefully opened and heated once again, in a stream of nitrogen washing over the top, to a temperature of 255° to 260°C.

During this period, the water added was removed from the system and polymerisation was carried out for 4 hours under these conditions.

At the end, the reactor was taken out of the bath and allowed to cool carefully in a vacuum.

The glass tube was broken and the polymer extracted was converted to a fine powder in a laboratory mill. The product of reaction was subjected to a treatment with toluene under heat in a Soxlhet extractor for 5 hours. The residue was dried in a vacuum at 70°C. In this way, 19.85 g of polymeric product were obtained with a yield of 90.3 percent.

The polymer produced had a melting point of 190°C and an inherent viscosity of 0.16 determined in a solution of metacresol at 35°C in a concentration of 0.5 g/100 ml.

The organic liquid of extraction was then concentrated in a rotary evaporator to approx. 100 to 120 ml and then washed three times with 100 ml of water in a 25 ml separating funnel.

The organic layer, brought to a state of dryness, left a residue of 0.65 g which was analysed in various ways:

a. 252 mg were dissolved in 20 ml methanol containing 5 percent water and and 7.7 ml NaOH N/10, rosolic acid being used as the indicator. This means that the residue was capable of containing 85 percent of the initially added acid.
b. Part of the residue was crystallised from a toluene-heptane solution (proportion 1:2 by weight). The crystals obtained (70 percent yield) had a melting point of 165° to 167°C (the melting point of the pure acid is 168° to 169°C).
c. The infra-red spectrum of the crystalline precipitate obtained at point b) showed that the substance consisted essentially of beta (4-hydroxy-3,5-ditertiary-butyl-phenyl) propionic acid. The liquor from washing the organic layer was collected and evaporated in a rotary evaporator. The residue obtained, 1.29 g, had a melting point of 68°C and consisted in the main of caprolactam.

EXAMPLE 2

This example is intended as a comparison with the previous one. In a 1-litre flask, a sample of 15 g commercial polycaprolactam was dissolved in 150 g 99 percent formic acid at 20°C.

To this solution, 8 g beta(4-hydroxy-3,5-ditertiary-butyl-phenyl) propionic acid, dissolved in 100 ml formic acid, was added.

While the solution was kept in agitation by means of a turbine arrangement, 700 ml water was added over approx. 30 minutes, causing a precipitate to form.

The precipitate obtained was washed thoroughly with water until the washing water gave a neutral reaction to a litmus paper.

The product was then dried in a vacuum oven at 70°C.

22.8 g (yield 99.2 percent) of a product was obtained which degraded at 200°C, becoming brown in colour. This product was then extracted under heat in a Soxlhet extractor with benzene over a period of 5 hours. The residue was then dried in a vacuum at 70°C. 14.74 g of mainly pure polycaprolactam was obtained.

The benzenic extract was evaporated until dry in a rotary evaporator. A residue of 7.81 g was obtained with a melting point of 168°/169°C, consisting essentially of beta (4-hydroxy-3,5-ditertiary-butyl-phenyl) propionic acid (comparison of titration and infra-red as indicated in Example 1).

EXAMPLE 3

A mixture of 15 g (132.7 × 10$^{-3}$ mols) pure commercial caprolactam and 5.8 g (18×10$^{-3}$ mols) methyl-beta-(4-hydroxy-3,5-ditertiary-butyl-phenyl)propionate was introduced into a tubular reactor identical to that used in Example 1. 0.26 ml water was then added to the mixture by means of a syringe.

The reactor was then treated with nitrogen and closed in the same way as described in Example 1.

The reaction was carried out under the same conditions as in Example 1.

The product of reaction, converted to powder, was extracted with toluene in a Soxlhet extractor. The product obtained was dried in an oven in a vacuum at 80°C.

16.37 g (yield 87%) of polymeric product was obtained with an inherent viscosity of 0.25 and a melting point of 194°C.

The toluene extract of the crude product of reaction was subjected to the same analytical operations as described in Example 1.

The residue of 3.2 g contained 0.36 g beta (4-hydroxy-3,5-ditertiary butyl-phenyl) propionic acid determined by titration.

This quantity corresponds to a content equal to 7.2 percent of the initial ester. The remaining 2.84 g consisted of caprolactam 90 percent (2.55 g) corresponding to approx. 17 percent of the initial caprolactam.

EXAMPLE 4

In a 1-litre flask fitted with an agitator and a collector of 20 ml capacity, with a tap surmounted by a reflux cooler of the type used for determining water with a light extracting solvent (Dean and Stark apparatus), 500 ml xylene and 20 g "Versamid" type polyamide were introduced.

The operation was carried out in an inert atmosphere created by a stream of nitrogen washing over the top of the reflux cooler.

The polyamide, with a molecular weight of approx. 5,000 contained 3 amine groups at the rate of 262 meq/100 g (the titration was performed by dissolving the polyamide in isopropyl alcohol and titrating with HCl N/10 using rosolic acid as an indicator).

The solution obtained was brought to boiling point for approx. 2 hours in an oil bath. During this time, 60 ml of solvent were discharged from the collector in order to eliminate all trace of moisture in the system.

After a certain cooling, a solution of 150 ml anhydrous xylene containing 14.57 g (52.4 × 10$^{-3}$ mols) beta-(4-hydroxy-3,5-ditertiary-butyl-pheynl)propionic acid was added. This was then heated and kept at boiling point for 4 hours.

During the first 3 hours of operation, approx. 0.95 ml water (theoretical quantity of reaction 0.943 ml) was separated in the collector.

The solution was finally cooled under nitrogen and then placed in a separating funnel and treated with 300 ml NaOH N/5 for 30 mins. in order to extract the unreacted acid by salification.

After separation, the organic layer was washed with 200 ml water twice and the washing liquors were combined with the NaOH solution previously separated.

The aqueous solution was titrated with 59.4 ml MCl N/1, methyl orange being used as an indicator. The solution was placed in a rotary evaporator and evaporated until dry.

33.6 g of the desired product was obtained (yield 97.3 percent).

EXAMPLE 5

29.2 g (0.2 mols) adipic acid in 250 ml ethanol were dissolved in a 500 ml vessel and the solution was then cooled to ambient temperature.

A solution of 23.43 g (0.202 mols) of hexamethylene diamine in 50 ml methanol was then added. This resulted in precipitation of the salt.

The pH value of a 1 percent aqueous solution in this salt was determined by a pH meter as being equal to 7.7. The solvent was evaporated and the salt dried to a constant rate. The crystalline salt obtained had a melting point of 199° to 200°C.

15 g ($57.25 \times 10^{-3}$ mols) of the salt were charged into a reaction tube identical to that used in Example 3. To it were then added 2.5 g ($9.10^{-3}$ mols) of beta-(4-hydroxy-3,5-ditertiary-butyl-phenyl) propionic acid. The tube is connected by a 3-way tap to a vacuum pump and to a low pressure (0.1 atm.) nitrogen source.

The air in the reactor was eliminated by an alternate application of vacuum and nitrogen, through at least five cycles. The tube was then closed while under a vacuum, the flame of a burner being used for the purpose. The reactor was heated in an oil bath to 215°C for 2½ hours, the same precautions being adopted as in Example 1. After this treatment, the tube was extracted from the oil bath and then cooled. The open topped tube was connected to the three-way tap.

After having once again eliminated the air, the reactor was heated to 283°C while a stream of nitrogen was passed over the top of it. This phase lasted four hours, subsequently, it was cooled to ambient temperature in a stream of nitrogen.

The crude product was subjected to thermal treatment with toluene for 3 hours in a Soxlhet extractor. The toluene solution of extraction was evaporated until dry in a rotary evaporator. The residue of 0.21 g analysed under infra-red rays proved to contain only traces (0.2 percent) of compounds having phenol groups. The end product was then dried in a vacuum oven at 70°C. 15.75 g were obtained, with a 90 percent yield.

EXAMPLE 6

A mixture consisting of 4 g ($15.27 \times 10^{-3}$ mols) hexamethylene diamine adipate, 4 g ($15.58 \times 10^{-3}$ mols) hexamethylene diamine sebacate and 3 g ($26.56 \times 10^{-3}$ mols) caprolactam was introduced into a reaction tube identical to that described in Example 1.

Finally, 3 g beta-(4-hydroxy-3,5-ditertiary-butyl-phenyl) propionic acid ($10.79 \times 10^{-3}$ mols) was added. The reaction mixture was then polymerised by the same procedures and under the same conditions as described in Example 4.

The product of reaction was dissolved in 200 ml methanol at boiling point and then precipitated by the addition of 400 ml water. The powdered product, after having been dried in an oven at 70°C under a vacuum, was subjected to extraction under heat in a Soxhlet extractor for 4 hours.

The residue was dried in an oven at 70°C in a vacuum. The polymeric product obtained weighed 11.5 g (yield 82.3%) and had an inherent viscosity of 0.25 measured in metacresol at 35°C.

The toluene solution of extraction was evaporated until dry, leaving a residue of 0.18 g. Infra-red analysis showed that approx. 45 percent of the residue was the phenol compound which had been added.

EXAMPLE 7

100 g distilled ε-caprolactone with a water content below 50 ppm was added to 120 ml anhydrous benzene in a 500 ml vessel. To this was added 6.33 ml of a 25 percent butyl-zinc toluene solution. All the operations required perfectly anhydrous conditions, achieved by means of a stream of nitrogen. The solution was agitated and then immersed in an oil bath at 60° C for 48 hours.

After cooling, the solution was placed in a separating funnel and washed three times with 0.05 N hydrochloric acid to eliminate all traces of catalyst. The solution was then washed thoroughly with water. n-heptane (approx. 600 ml) was then added to the benzene solution, placed in a 1-litre flask fitted with an agitator, precipitation of the polymer being caused thereby.

The precipitate, filtered after washing with heptane, was dried in a vacuum at ambient temperature.

In this way, 95.5 g polymer were obtained with a reduced viscosity equal to 2.20 determined in concentration of 0.2 g/100 ml in benzene at 30°C.

30 g of this product were mixed with 2.5 g ethyl-beta-(4-hydroxy-3,5-ditertiary-butyl-phenyl) propionate in a tubular reactor in a nitrogen atmosphere. The system was kept at a temperature of 120°C for 15 hours by immersion in an oil bath.

When this time had elapsed, the product was extracted and dissolved in 15 ml of benzene. To the solution were then added 300 ml heptane, under agitation, resulting in precipitation of the finely divided polymeric product. After filtration and thorough washing with heptane, the product was dried in a vacuum at ambient temperature.

32 g of product were obtained with a reduced viscosity of 1.02 determined in benzene. The infra-red spectrum revealed the presence of approx. 2.3 percent phenol groups in the product.

The mixture of benzene-heptane, filtered and blended with the washing heptane, was evaporated until dry in a rotary evaporator.

The residue obtained was 0.35 g.

EXAMPLE 8

In a 1-litre vessel, a solution of 10.3 g (0.10 mols) diethylene triamine and 10.82 g (0.102 mols) sodium carbonate in 200 ml of water was prepared.

A solution of 20.3 g (0.1 mols) phthaloyl chloride and 5.93 g (0.02 mols) beta-(4-hydroxy-3,5-ditertiary-butyl-phenyl) propionyl chloride in 200 ml tetrahydrofuran was added to the solution, kept at 0°C, rapidly under vigorous agitation. The polymer precipitated immediately in fibrous form. The product obtained by filtration of the suspension was washed repeatedly in water and was finally dried in an oven at 70°C under a vacuum. The product was then subjected to extraction with toluene in a Soxlhet extractor for 5 hours while the residue was dried in an oven at 70°C under a vacuum.

23.3 g of end product were obtained, a yield of 80 percent.

The extraction toluene, evaporated to dryness in a rotary evaporator, left a residue of 0.052 g.

EXAMPLE 9

A mixture of 11 g, consisting of 4 g ($15.27 \times 10^{-3}$ mols) of hexamethylene diamine adipate, 4 g ($12.50 \times 10^{-3}$ mols) hexamethylene diamine sebacate and 3 g ($26.56 \times 10^{-3}$ mols) caprolactam, was introduced into a reaction tube identical to that described in Example 1.

After 1.5 g (6.38 × 10$^{-3}$ mols) of (4-hydroxy-3,5-ditertiary-butyl-phenyl) methyl amine had been added, the reaction mixture was polymerised by the same methods and under the same conditions as described in Example 5.

The product of reaction obtained was dissolved in 500 ml of methanol at boiling point and then precipitated by the addition of 400 ml of water.

After drying in an oven in a vacuum and at 70°C, the product was subjected to extraction under heat in a Soxlhet extractor for 4 hrs.

The residue was dried in an oven at 70°C under a vacuum. The polymeric product obtained weighed 10.25 g (yield 82%) with an inherent viscosity of 0.30 measured in metacresol at 35°C.

The toluene extraction solution was evaporated until dry in a rotary evaporator and left a residue of 0.30 g.

Infra-red analysis showed the residue to have a phenol compound content equal to 10 percent.

EXAMPLE 10

50 g (442.5 × 10$^{-3}$ mols) purified caprolactam with a water content of 20 ppm was introduced into 500 ml three-necked flask fitted with an agitator and with an attachment for maintaining the system under a nitrogen flow.

After the flask had been placed in an oil bath at 90° to 100°C, 0.436 g (19 × 10$^{-3}$ mols) of sodium was added in the form of a 50 percent dispersion in paraffin. In this way, sodium-caprolactam was formed. The reaction system was then brought to a temperature of 180°C by immersion in an oil bath and, under agitation, 21.65 g (190 × 10$^{-3}$ mols) of ε-caprolactone was added, with a water content equal to or less than 20 ppm.

The mixture was then agitated for 3 hours in a stream of anhydrous nitrogen, after which 3.516 g (12.65 × 10$^{-3}$ mols) of beta-(4-hydroxy-3,5-ditertiary-butyl-phenyl) propionic acid was added. The viscous mixture was kept under agitation for another 30 minutes and then cooled.

The resultant polymer product, dissolved in 250 ml of formic acid at ambient temperature was then precipitated from the solution by the addition of an excess of water.

After washing cold with water and drying in an oven at 60°C, the polymer was subjected to extraction under heat for 5 hours with benzene in a Soxlhet extractor in order to eliminate the polyester which had been formed, together with any unreacted added acid.

The product left was finally dried in an oven at 70°C. 69.1 g of polymer (yield 92%) with a reduced viscosity of 0.81, measured at 35°C in metacresol in a concentration of 0.2 g per 100 ml, was obtained.

The product melted at 164° to 166°C. The benzene extract was concentrated in a rotary evaporator to approx. 100 to 200 ml and then placed in a separating funnel of 250 ml capacity.

In order to determine the content of unreacted acid, the benzene was treated for 5 minutes with 150 ml NaOH N/10, and then washed twice with 50 ml of water. The aqueous solutions were combined and titrated with 14.95 ml HCl N/1, methyl orange being used as the indicator.

EXAMPLE 11

The polymeric product obtained in Example 1 was powdered and 0.8 percent added to a sample of polyformaldehyde acetylated powder with an inherent viscosity equal to 1.7 (the polyoxymethylene was obtained by polymerisation of pure formaldehyde monomer in toluene in the presence of an initiator such as triphenyl phosphene and a regulator such as diphenyl amine, and then acetylated with acetic anhydride in order to esterify the terminal groups of the macromolecules).

Stabilised in this way, the formaldehyde polymer was then homogenised and converted to 2 × 2 mm granules by means of a screw extruder working at a temperature of 190° to 220°C and an automatic cutter.

The following tests were performed on the granulate (Pom 2):

thermal degredation at 220°C in a nitrogen atmosphere ($K_{220}$), rate of decomposition in percentage by weight of polymer per minute during the first 30 minutes;

thermal degradation at 220°C in air ($D_{220}$) = percentage loss of polymer after 10 and 20 minutes of heating.

In parallel, the same tests were carried out with the polymer of formaldehyde previously described and in non-stabilised form (Pom 1) and stabilised by the addition of 0.5 percent polycaprolactam and 0.3 percent 4,4'-butylidene-bis(3-methyl-6-tertiary-butyl) phenol (Pom 3).

The results obtained are set out in Table 1.

Table 1

| Sample | $K_{220}$ | $D_{220}$ | |
|---|---|---|---|
| | | 10 mins. | 20 mins. |
| Pom 1 | 0.1 | 16.1 | 56.3 |
| Pom 2 | 0.03 | 0.4 | 0.8 |
| Pom 3 | 0.03 | 1.3 | 2.1 |

The stabilised samples of polyoxymethylene previously examined were subjected to treatment with toluene at boiling point in a Soxlhet extractor for 20 hours.

The samples were then dried in a vacuum over at 80°C and again subjected to thermal degradation in air (Pom 2 mins. – Pom 3 mins.).

The toluene extract was in each case brought to dryness in a rotary evaporator and the residuum was determined and analysed by infra-red spectrum.

The extraction residue of Pom 3 showed an essential content of the antioxidising agent 4,4'-butylidene-bis(3-methyl-6-tertiary-butyl-phenol).

The results are set out in Table 2.

Table 2

| Sample | R | $D_{220}$ | |
|---|---|---|---|
| | | 10 mins. | 20 mins. |
| Pom 2' | 0.05 | 0.6 | 1.1 |
| Pom 3' | 0.32 | 3.5 | 8.9 |

R = percentage by weight of extract with respect to polymer.

EXAMPLE 12

The polymeric product obtained in Example 3 (polymerisation of ε-caprolactam in the presence of m-ethyl-beta(4-hydroxy-3,5-ditertiary-butyl-phenyl propionate) was powdered and added in a quantity of 1 percent to a sample of acetylated polyformaldehyde with an inherent viscosity equal to 1.5.

The formaldehyde polymer thus stabilised was then granulated and subjected to a thermal degredation test, in air, as described in Example 11 (Pom 4).

In parallel, the same test was carried out on a sample of the same polymer of formaldehyde, stabilised with 0.5 percent polycaprolactam and 0.5 percent methyl-beta(4-hydroxy-3,5-ditertiary-butyl-phenyl) propionate (Pom 5).

The results are set out in Table 3.

Table 3

| Sample | $D_{220}$ | |
|---|---|---|
| | 10 mins. | 20 mins. |
| Pom 4 | 0.5 | 1.0 |
| Pom 5 | 2.0 | 4.1 |

EXAMPLE 13

The product obtained as in Example 6 (polymerisation of hexamethylene diamine adipate, hexamethylene diamine sebacate and caprolactam in the presence of beta-(4-hydroxy-3,5-ditertiary-butyl-phenyl) propionic acid was dissolved in methanol so as to produce a concentration of 20 g per 100 ml of solvent. Acetylated polyformaldehyde powder was added to the solution, with an inherent viscosity equal to 1.4. Subsequently, under agitation, demineralised water was added in quantities equal to 3 parts per part of alcohol fraction.

In this way, the stabiliser was precipitated in the presence of polyformaldehyde and the quantities were regulated so as to have 2 parts by weight of stabiliser to every 3 parts by weight of polymer.

The resultant homogeneous suspension was filtered by means of a scraping centrifuge.

The solid stratum was then dried in a pneumatic transport dryer.

Then 50 parts by weight of stabiliser-rich polymer were blended with 950 parts of formaldehyde polymer with an inherent viscosity of 1.80. In this way, the polymer contained 1 percent of stabiliser.

The polymer which had thus been stabilised (Pom 5) was extruded at approx. 220°C and converted to granules as indicated in Example 11.

The granular polymer obtained was subjected to extraction with methanol under heat in a Soxlhet extractor for 20 hours. Subsequently, the sample (Pom 5') was dried in a vacuum oven at 60°C.

The quantity of extract was less than 5 percent with respect to the stabiliser initially added.

The two samples of polyoxymethylenes were subjected to the thermal degradation test in air and in nitrogen as described in Example 11.

The results are set out in Table 4.

Table 4

| Sample | $K_{220}$ | $D_{218}$ | |
|---|---|---|---|
| | | 10 mins. | 20 mins. |
| Pom 5 | 0.03 | 0.4 | 0.8 |
| Pom 5' | 0.03 | 0.6 | 1.0 |

The results demonstrate the formation of a bond between the polymer to be stabilised and the stabiliser added, since this latter, while being in itself soluble in methanol, cannot be extracted from the polymer/stabiliser mixture with this solvent.

EXAMPLE 14

The polymeric products obtained by polymerisation of 30°g laurolactam and 5.28 g methyl-beta-(4-hydroxy-3,5-tertiary-butyl-phenyl) propionate can be used as in the same procedure as in Example 1, is added in a quantity of 0.20 percent to a sample of powdered polypropylene.

After homogenisation in the molten state through an extruder and granulation, a film was stamped out to a thickness of 25 mil. The film (PR 2) was subjected to a brittleness test (HF) in an oven at 150°C (HF = time in hours until brittleness achieved). At the same time, the same test was carried out with polypropylene in unstabilised form (PR 1).

The results obtained are set out in Table 5.

Table 5

| Sample | HF |
|---|---|
| PR 1 | 16 |
| PR 2 | 630 |

EXAMPLE 15

Two polypropylene films were prepared in a thickness of 25 mil, one stabilised with 0.10 percent 1,3,5-trimethyl-2,4,6-tri(3,5-ditertiary-butyl-phenyl-4-hydroxy-benzyl) benzene (PR 3) and another stabilised with 0.1 percent of product obtained from polymerisation of 30 g laurolactam and 5.28 g methyl-beta-(4-hydroxy-3,5-ditertiary-butyl-phenyl) propionate (PR 4) using a method identical to that described in Example 1.

The films were subjected to an extractive treatment under heat with a solution of dodecylbenzene-based detergent in a concentration of 0.5 g/litre, for 5 days.

Before and after the treatment, the films were subjected to a brittleness test (HF) in an oven at 150°C. The results are shown in Table 6.

Table 6

| Sample | HF | |
|---|---|---|
| | Before | After |
| PR 3 | 330 | 25 |
| PR 4 | 340 | 270 |

What we claim is:

1. A stabilizer for a polymeric material selected from the group consisting of polyamide, polyacetal, polycarbonate, polyethylene terephthalate, polystyrene, polyolefin, polyethylene oxide and polyvinyl chloride, which comprises a product having a molecular weight in excess of at least 1,000 and characterized as being free from hydroxyl groups to the extent of at least 0.005 percent by weight, said stabilizer being obtained by:

1. polymerizing a lactone of the formula:

wherein $n$ represents an integer of from 3 to 13 or a lactam of the following formula:

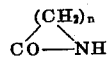

wherein $n$ represents an integer ranging from 3 to 13 or a compound having a primary or secondary reactive amino group, said compound selected from the group consisting of a polyamide, a polyamine, and an amino acid, and optionally in the presence of a dibasic acid represented by the formula:

$$R(COOH)_2$$

wherein R represents a member selected from the group consisting of an aliphatic group, an aromatic group and a cycloaliphatic group with a phenolic compound of the following formula:

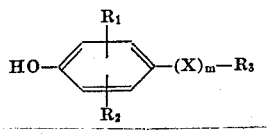

wherein X represents a linear or branched chained alkyl radical; $R_1$ and $R_2$ represent the same or different alkyl radicals, having a carbon range of from one to six carbon atoms; $R_3$ represents a member selected from the group consisting of a carboxyl group, an esterified carboxyl group, and a halogenated carboxyl group; and $m$ represents an integer of 0 or 1; or 2. by reacting a phenol compound as described in (1) above with the polymerization product of said lactone, lactam or compound having primary or secondary reactive amine groups as described in (1) above, optionally in the presence of a dibasic acid as described in (1) above; or 3. by polymerizing a lactone or a lactam or a compound of the formula $$R(COX)_m$$

wherein R represents a member selected from the group consisting of an aliphatic group, an aromatic group and a cycloaliphatic group; X represents a member selected from the group consisting of a hydroxyl group and a halogen atom; and $m$ represents an integer of 2 or more; optionally in the presence of a diamine of the formula:

$$R(NH_2)_2$$

wherein R represents a member selected from the group consisting of an aliphatic group, an aromatic group and a cycloaliphatic group with a phenolic compound as described in (1) above; or 4. reacting a phenolic compound as described in (1) above, with a compound of the formula:

$$R(COX)_m$$

wherein R represents a member selected from the group consisting of an aliphatic group, an aromatic group, and a cycloaliphatic group; wherein X represents a member selected from the group consisting of a hydroxyl group and a halogen atom; and wherein $m$ represents an integer of 2 or more, and optionally in the presence of a diamine as defined in (3) above, said reactants, in each of items (1) through (4) above, being present in a molar ratio 0f 1:1, and said reaction being carried out at a temperature in excess of 100°C.

2. A stabilized polymer of acetylated formaldehyde, containing from 0.001 to 10.08 percent of a stabilizing polymeric substance of claim 1 having a molecular weight greater than 1,000 and being free from phenolic groups in excess of 0.005 weight per cent, obtained by co-polymerizing (I) a monomer capable of forming a polyamide and (II) a member selected from the group consisting of β-(4-hydroxy-3,5-ditertiary-butyl-phenyl)-proprionic acid, the chloride of said acid, and the methyl and ethyl esters of said acid.

3. The stabilized polymer of claim 2, wherein the monomer of (I) is a caprolactam and the member of (II) is β-(4-hydroxy-3,5-ditertiary-butyl-phenyl)-proprionic acid.

* * * * *